Dec. 13, 1960   A. L. VAN STAPPEN   2,964,423
DRAFTING FILMS
Filed Nov. 19, 1958

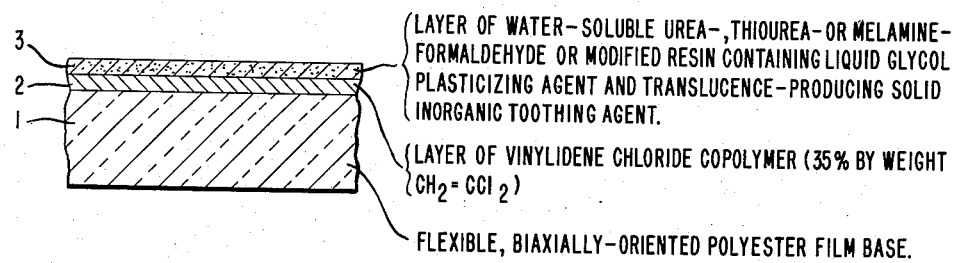

3 — LAYER OF WATER-SOLUBLE UREA-, THIOUREA- OR MELAMINE-FORMALDEHYDE OR MODIFIED RESIN CONTAINING LIQUID GLYCOL PLASTICIZING AGENT AND TRANSLUCENCE-PRODUCING SOLID INORGANIC TOOTHING AGENT.

2 — LAYER OF VINYLIDENE CHLORIDE COPOLYMER (35% BY WEIGHT $CH_2=CCl_2$)

1 — FLEXIBLE, BIAXIALLY-ORIENTED POLYESTER FILM BASE.

INVENTOR
ALBERT LOUIS VAN STAPPEN

BY Lynn Barratt Morris
ATTORNEY 2,964,423
DRAFTING FILMS

Albert Louis Van Stappen, Rumson, N.J., assignor to E. I. du Pont de Nemours and Company, Wilmington, Del., a corporation of Delaware Filed Nov. 19, 1958, Ser. No. 774,822

14 Claims. (Cl. 117—76)

This invention relates to flexible translucent coated film for drafting purposes. More particularly the invention relates to such drafting films having an improved surface for use with a wide variety of drafting pens and pencils. The invention also relates to a process for making such drafting films.

It is known to provide drafting materials consisting of cloth and paper on which there are coated layers of transparentizing materials and layers containing abrasive materials. These materials have a number of disadvantages. Paper becomes brittle with age and lacks strength and durability. Thus, it becomes creased and the corners get bent, folded and torn during drafting and in use of the final drawing. Tracing cloth is stronger but it likewise becomes brittle with age. It is also quite difficult to manufacture these drafting papers and cloths which are of uniform translucency. It requires, in most cases, several costly coatings to provide the proper degree of transparency and the right amount of abrasiveness. Drafting sheets comprising a film base composed of vinyl copolymers, polyesters and polyamides are known. Such films have been coated with various resinous compositions including acrylic polymers and copolymers and/or heat hardenable phenolic resins containing toothing agents such as silica, titanium dioxide, diatomaceous earth, magnesium carbonate, etc. The above films offer advantages in tracing materials for drafting surfaces particularly polyester films, e.g., polyethylene terephthalate. Such films are more dimensionally stable than paper or cloth and do not require the application of transparentizing coatings. However, the coatings of the prior art have not been entirely suitable for drafting or tracing surfaces. The main disadvantage is lack of sufficient hardness of these coatings to resist being scratched or scribed by hard pencils. Another disadvantage is that the prior art methods of manufacture require that the layers for the drawing surfaces be coated on hydrophobic films from an organic solvent solution. This method of manufacture requires more elaborate coating equipment including expensive solvent recovery systems.

The above-described disadvantages can be overcome and a dimensionally stable, durable, high-quality drafting film provided in accordance with the invention. This drafting film comprises a flexible, biaxially-oriented, highly polymeric polyester film substantially composed of the polyesterification product of a dicarboxylic acid and a dihydric alcohol having on one or both surfaces, in order (1), a thin layer (e.g., 0.5-4 mg./dm.² dry weight) of an adherent film-forming essentially hydrophobic organic copolymer and (2) a thin layer (e.g., 5 to 15 microns) of a water-soluble nitrogen-containing formaldehyde resin taken from the group consisting of urea-formaldehyde, thiourea-formaldehyde and melamine-formaldehyde resins and their cationic-modified, aliphatic mono- and polyamine-modified and guanidine-modified forms, containing (a) a liquid aliphatic glycol (including polyglycol plasticizing agent) and (b) uniformly dispersed, finely divided discrete particles of a water-insoluble-translucence-producing, solid inorganic toothing agent. The drafting films provided by the invention may contain still other layers than those mentioned above.

The drafting film just described is shown schematically in the accompanying drawing which constitutes a part of this application. In the drawing, the flexible, biaxially-oriented polyester film base 1 has coated thereon layer 2 composed of the vinylidene chloride copolymer which in turn carries layer 3 composed of the water-soluble resin, referred to in the preceding paragraph, containing the liquid glycol plasticizing agent and the translucence-producing solid inorganic toothing agent.

The drafting films can be made by applying to the surface of the hydrophobic copolymer layer on the oriented polyester base film an aqueous coating solution containing the water-soluble amino- or amido-formaldehyde resin, the plasticizing agent and the dispersed particles of the toothing agent and drying the resulting solution. Afterwards the coated film can be further heated and cured.

In the preferred aspect of the invention the copolymer coated polyester film used to make the drafting film has a thickness from 3 to 10 mils, and is dimensionally stable, that is, it exhibits a shrinkage of not more than 0.2% both in longitudinal and lateral direction when heated free from tension to a temperature of 120° C. for a period of 5 minutes. Suitable copolymer-coated polyester films of the foregoing type are described in Alles U.S. Patent 2,779,684 and in the patents referred to therein. The preferred films, however, have a polyethylene terephthalate base and a vinylidene chloride copolymer layer wherein the addition copolymer contains at least 35% by weight of vinylidene chloride.

Various conventional coating devices can be used to apply the solution of the water-soluble resin containing the dispersed particles of toothing agent. Thus, the solutions can be fed from a gravity-feed or pressure-fed hopper or they can be applied by dip-coating techniques or by means of bead coating or applicator rolls. The thickness of the coating can be controlled by means of doctor blades or by means of air streams, e.g., air-doctor knives.

In general, the aqueous coating solution will contain from about 20% to 31% by weight of the water-soluble resin, from 1 to 10% by weight of the glycol and 13 to 20% by weight of the toothing agent based on the weight of the water. Small amounts of coating aids, solvents, e.g., methanol or ethanol, thickening agents, etc. can be present.

The toothing agents, e.g., silica, ground glass, titanium dioxide, chalk, talc, diatomaceous earth and magnesium carbonate can vary in average particle size from about 0.1 to 10 microns but preferably have an average particle size of 0.2 to 4 microns.

In the preferred aspect of the invention, the oriented polyester film base has a vinylidene chloride/acrylic ester/itaconic acid copolymer layer containing such components in amounts by weight of 35 to 96.0%, 3.5 to 64.5% and 0.5 to 2.5% on each surface of the oriented polyester base and the resin-toothing layer is coated on each layer of the copolymer. The copolymer layer is exceedingly thin, 0.5-4 mg./dm.², and is usually applied to the polyester base prior to orienting it and rendering it dimensionally stable. This vinylidene chloride copolymer coated base, preferably a polyethylene terephthalate film, can be made after the manner described in Alles et al. U.S. Patent 2,627,088 and Alles U.S. Patent 2,779,684 and will exhibit shrinking of not more than 0.2% in both longitudinal and lateral directions when not under tension and heated to a temperature of 120° C. for a period of 5 minutes.

The various vinyl esters (including acrylonitrile) which can be used in making the vinylidene chloride copolymers, are those disclosed in the Alles et al. patent. A suitable copolymer may be composed of 75–95% vinylidene chloride, 4 to 20% methyl acrylate and 1 to 5% itaconic acid. The coating of the dispersion of the toothing agent in the resin is preferably dried for about 20 to 40 seconds at about 70 to about 95° C. and then cured by further heating under no substantial tension to 110 to 125° C. for about 3 to 5 minutes and further cured by heating it at about 80° C. for three days. The rolls of film can be cured further by storing them at room temperature for periods up to 8 weeks. The drafting films made as described above not only are readily receptive to initial pencil marking and ink marking with the usual type of drafting instruments but the marking can be erased and remarked without resorting to reconditioning the surface with french chalk or other expedients. In addition, they have the same high degree of non-shrinkage as the film base referred to above.

The invention will be further illustrated by but is not intended to be limited to the following examples:

*Example I*

A dimensionally stable vinylidene chloride/methyl acrylate/itaconic acid copolymer coated polyethylene terephthalate film base as described in Example IV of Alles U.S. Patent 2,779,684 was coated with a solution containing a water-soluble guanidine-modified urea-formaldehyde resin and having the following composition:

| | | |
|---|---|---|
| Guanidine-modified urea-formaldehyde resin | grams | 3,280 |
| Silica (average particle size 2–4 microns) | do | 1,730 |
| Formic acid to pH 2.5 | ml | 1,375 |
| Saponin 10% | ml | 275 |
| Ethylene glycol | grams | 80 |
| Water to make 37% solids | ml | 11,780 |

The dispersion was coated on the support at a coating weight of 100–125 mg./dm.² This gave a layer thickness of from 0.3 to 0.35 mil. The coating was dried at 90° C. for 30 seconds, then cured at 120° C. for 4 minutes.

The resulting film was found to be excellent as a drafting film. Sharp lines could be drawn thereon with a 6H drafting pencil or a drafting pen with no indication of abrasion or breakthrough of the drafting surface. The film had excellent transparency which allowed accurate tracing and reproduction. Repeated erasures could be made with no impairment of the original characteristics of the surface to function in the above described manner.

*Example II*

An aqueous dispersion was made as follows:

| | Grams |
|---|---|
| Melamine-formaldehyde resin (water-soluble) ("Accabond" 3900 28% solids—American Cyanamid) | 400 |
| Silica (average particle size 5–8 microns) | 55 |

The silica was dispersed in the resin solution by ball milling. To 400 grams of the resulting dispersion there was added enough formic acid (20%) to adjust the pH to 3.0 and 10 ml. of 10% saponin. The resulting mixture was coated on 4-mil dimensionally stable vinylidene chloride/acrylic ester/itaconic acid coated polyethylene terephthalate film made according to Example IV in Alles U.S. 2,779,684 to form a drafting layer having a thickness of 2 mils. The film was dried and cured as described in Example I. The resulting film had similar characteristics to that described in Example I although the film was slightly less transparent.

*Example III*

A dispersion was made up as follows:

| | | |
|---|---|---|
| Melamine-formaldehyde resin (water - soluble) ("Scriptite" 33—Monsanto Chemical Co.) | grams | 80 |
| HCl—23 Baumé | ml | 20 |
| Water | ml | 400 |

The resin solution was stirred until dissolved. Into this solution there was dispersed by ball milling 20 grams of silica having an average particle size of 5–8 microns and 20 grams of silica having an average grain size of 2–4 microns. Enough formic acid was added to 400 grams of this dispersion to adjust the pH to 2 and then 10 ml. of 10% saponin was added. The dispersion was coated on the 4-mil film of Example II and dried and cured as described in that Example. The characteristics of this film were similar to those of the film in Example II.

*Example IV*

A dispersion was made as follows:

| | | |
|---|---|---|
| Melamine-formaldehyde resin (water-soluble) ("Cymel 405"—American Cyanamid) | grams | 200 |
| Ethyl alcohol | ml | 80 |
| Water | ml | 320 |

The resin solution was heated to 120° F. and maintained at this temperature. To this solution there was added 100 grams of silica having an average particle size of 5 to 8 microns and the mixture was ball-milled to obtain a uniform dispersion.

The resulting dispersion was coated, dried and cured as described in Example II. The characteristics of the resulting film are comparable to those of the film in that example.

*Example V*

An aqueous dispersion was made as follows:

| | | |
|---|---|---|
| Melamine-formaldehyde resin (water soluble) ("Cymel 430"—American Cyanamid) | grams | 200 |
| Isopropanol | ml | 80 |
| Water | ml | 320 |

The resin solution was heated to 160° F. and maintained at this temperature. Into the resulting solution there was dispersed by ball-milling 100 grams of silica having an average particle size of 6–8 microns. The pH of a 400-gram portion was adjusted to 4.5 with 20% formic acid and 10 ml. of 10% saponin were added. The resulting dispersion was coated, dried, and cured as described in Example II. The resulting coating showed good adhesion to the base and excellent characteristics to drawing with hard pencils and inking pens and also good erasure characteristics.

*Example VI*

An aqueous dispersion was made containing the following materials:

| | Kg. |
|---|---|
| Urea-formaldehyde resin (water-soluble) | 154.0 |
| Silica (average particle size 2–4 microns) | 89.7 |
| Titanium dioxide (average particle size 0.2 to 0.3 microns) | 4.7 |
| Ethylene glycol | 14.4 |
| Ethyl alcohol | 20.6 |
| Water | 261.0 |

The materials were premixed, then passed through a sand mill to disperse the solids. After sand-milling, the dispersion was diluted with water to 29.5% by weight and 12.5 kg. of saponin was added and then the pH was adjusted to 3.0 with formic acid. The resulting dispersion was coated on both sides of the coated polyethylene terephthalate film described in Example I in a manner to give a dried layer thickness of 0.3 mil. The coated film was dried in an air impingement drier at 88° C.

for about 40 seconds. The dried film was cured at 120° C. for about 5 minutes and then rolled up and cured further at 80° C. for about 4 days. The resulting film was found to have an excellent surface for drafting work and could be used with pencils of all grades of hardness.

*Example VII*

A film as described in Example I was coated on one side with the dispersion described in Example VI. On the opposite side there was coated an aqueous dispersion of the following composition:

|   | Kg. |
|---|---|
| Barium acetate | 22.4 |
| Water | 75.5 |
| Sulfuric acid (16%) | 54.1 |
| Ethylene glycol | 3.1 |

The barium acetate was dissolved in the water and the sulfuric acid was added over a period of 30 minutes with vigorous agitation to precipitate the barium sulfate, the temperature being maintained at 55° C. The ethylene glycol was added to the reaction mixture and the resulting mixture was added to the following solution.

|   | Kg. |
|---|---|
| Urea-formaldehyde resin (water-soluble) | 52.8 |
| Ethyl alcohol | 8.9 |
| Formic acid to adjust pH to 3.0. |   |
| Saponin | 1.1 |
| Water | 79.2 |

The final mixture contained about 24% total solids with a ratio of barium sulfate to urea-formaldehyde resin of 0.4/1.

The film was dried and cured as described in Example VI. The dried film provides an excellent drafting surface for all grades of pencils on the side containing the silicon dioxide dispersion and a surface suitable for making ink tracing on the barium sulfate dispersion coated side. The film had excellent non-curling characteristics.

*Example VIII*

A film as described in Example I was coated on one side with the dispersion in Example VI except that after the pH was adjusted to 3.0 with formic acid, orthophosphoric acid was added to further reduce the pH to 2.6. After coating one surface of the film with this dispersion the opposite surface of the film is coated with the barium sulfate dispersion disclosed in Example VII. The film is then dried at 190° F. for 30 seconds followed by exposure to air at 120° C. for 30 seconds. A drawing surface was obtained which was sufficiently hard for 6 H pencil, no further heat treatment or aging being necessary. The use of orthophosphoric acid eliminates an extended curing time.

*Example IX*

Example I was repeated using iminobispropanolamine-modified urea-formaldehyde resin in place of the guanidine-modified resin of that example. All other ingredients, conditions of coating and drying were the same as in Example I.

*Example X*

Example I was repeated except that the guanidine-modified urea-formaldehyde resin dispersion was made in five portions of 1000 grams each. To each of four portions there was added 4, 8, 20 and 40 ml. portions respectively of a 30% isopropanol solution of the Werner type complex of chromic chloride and myristic acid. All of the trials using various quantities of the Werner complex substantially improved the receptivity of the surface for ink by eliminating the tendency for the ink to spread or feather. Other Werner type chromium-carboxylic acid complexes including those of fatty acids of 12 to 20 carbon atoms, e.g., lauric, palmitic, margaric, stearic and arachidic, can be used in amounts from 0.1 to 10%, preferably 0.5 to 4% by weight, based on the weight of the water soluble resin, e.g., urea-formaldehyde resin.

The invention is not limited to the film structures or particular resins of the foregoing examples. Many other water-soluble, amido- and amine-aldehyde resins will be found to be suitable. These resins should be heat curable to form water-insensitive films. Upon being heat cured they acquire also sufficient hardness to resist abrading or scratching by at least a 6 H grade drawing pencil. Suitable resins will be found in Ellis' "The Chemistry of Synthetic Resins" (published by Reinhold Publishing Corp. (1935)), and in D'Alelio U.S. Patent 2,334,545 which describes condensation products of urea, aliphatic aldehydes and a mono salt of a polyamine. Suitable cationic-modified water-soluble urea-formaldehyde resins are disclosed in Keim U.S. Patent 2,826,500, and suitable amine-modified urea formaldehyde resins are also disclosed in Romatowski U.S. Patent 2,827,441.

The support need not necessarily be 4-mil polyethylene terephthalate film but may be composed of other dimensionally stable polyester films which are disclosed in Carothers U.S. Patent 2,071,250 and Whinfield et al. U.S. Patent 2,465,319 bearing a thin layer of an adherent film-forming essentially hydrophobic copolymer as disclosed in Alles et al. 2,627,088 and Alles 2,779,684 and the patents referred to in the specifications of these patents. Other suitable supports are the polyethylene terephthalate/isophthalates of British Patent 766,290 and Canadian 562,672 and those obtainable by condensing terephthalic acid or dimethyl terephthalate with propylene glycol, diethylene glycol, tetramethylene glycol or cyclohexane-1,4-dimethanol (hexahydro-p-xylene alcohol).

A variation of the drafting films described in the examples can be made by coating on the opposite side of the support a layer of the same urea-formaldehyde resin aqueous solution containing other pigments. This increases planarity and reduces any tendency of the drafting film to warp, curl or buckle.

The invention offers a practical means of providing a tracing film having good transparency and good resistance to extremely hard drafting pencils and pens. It also provides an economical means of manufacture. The drawing surface coating can be applied from an aqueous medium.

An important advantage of the novel drafting films of the invention is that they are flexible but do not tend to crease or become torn or folded at the corners. They are durable and do not deteriorate upon aging and retain their excellent stability even upon fairly wide changes in relative humidity. The toothing coat is flexible while having an excellent drafting surface, is resistant to abrasion and does not become brittle or flake off during rough handling. Still further advantages will be apparent from the above description of the invention.

What is claimed is:

1. A dimensionally stable drafting film comprising a flexible, biaxially-oriented, highly polymeric polyester film substantially composed of the polyesterification product of a dicarboxylic acid and a dihydric alcohol having on at least one surface, in order, (1) a thin layer of an adherent film-forming, essentially hydrophobic organic vinylidene chloride copolymer containing at least 35% by weight of vinylidene chloride, and (2) a thin layer of a water-soluble resin taken from the group consisting of urea-formaldehyde, thiourea-formaldehyde and melamine-formaldehyde resins and their cationic-modified, aliphatic mono- and polyamine-modified and guanidine-modified forms containing (a) a liquid glycol plasticizing agent and (b) uniformly dispersed, finely-divided discrete particles of a water-insoluble, translucence-producing, solid inorganic toothing agent having an average particle size from 0.1 to 10.0 microns.

2. A drafting film as defined in claim 1 wherein the layer of water-soluble resin is on both surfaces of the film.

3. A drafting film as defined in claim 1 wherein said copolymer is a vinylidene chloride/acrylic ester/itaconic acid containing said ingredients in the respective amounts of 35 to 96%, 3.5 to 64.5% and 0.5 to 25.0%, by weight.

4. A drafting film as defined in claim 1 wherein said water-soluble resin is a guanidine-modified urea-formaldehyde resin.

5. A drafting film as defined in claim 1 wherein said water-soluble resin is a melamine-formaldehyde resin.

6. A drafting film as defined in claim 1 wherein said polyester is a polyethylene terephthalate.

7. A drafting film as defined in claim 1 wherein said glycol is ethylene glycol.

8. A drafting film as defined in claim 1 wherein the toothing agent is silica having an average particle size from 0.2 to 4 microns.

9. A drafting film as defined in claim 1 wherein said polyester film has a thickness from 3 to 8 mils and the entire film exhibits shrinkage in both longitudinal and in a direction 90° thereto of not more than 0.2% when heated under no significant tension to a temperature of 120° C. for a period of 5 minutes.

10. A drafting film as defined in claim 1 wherein the layer of water-soluble resin contains a Werner complex of chromic chloride with a fatty acid of 12 to 20 carbon atoms.

11. A process as defined in claim 10 wherein said film is dried by heating it for about 20 to 40 seconds at about 70 to about 95° C.

12. A drafting film as defined in claim 1 wherein the other side of the base is coated with a thin layer of an aforesaid water-soluble resin containing barium sulfate.

13. A process as defined in claim 12 wherein the dried film is cured by heating it from 110° C. to about 125° C. for about 3 to about 5 minutes.

14. The process which comprises applying a thin layer from an aqueous solution of a water-soluble resin, taken from the group consisting of urea-formaldehyde, thiourea-formaldehyde and melamine-formaldehyde resins and their cationic-modified, aliphatic mono- and polyamine-modified and guanidine-modified forms containing (a) a liquid glycol plasticizing agent and (b) uniformly dispersed, finely-divided discrete particles of a water-insoluble, translucence-producing, solid inorganic toothing agent having an average particle size from 0.1 to 10.0 microns, to at least one hydrophobic copolymer surface of a film comprising a flexible, biaxially-oriented, highly polymeric polyester film substantially composed of the polyesterification product of a dicarboxylic acid and a dihydric alcohol having on at least one surface a thin layer of an adherent, film-forming, essentially hydrophobic organic vinylidene chloride copolymer containing at least 35% by weight of vinylidene chloride, and drying the resulting layer to form said copolymer surface.

References Cited in the file of this patent

UNITED STATES PATENTS

| | | |
|---|---|---|
| 2,718,476 | Eichom | Sept. 20, 1955 |
| 2,779,684 | Alles | Jan. 27, 1957 |